(12) United States Patent
Goenueldinc

(10) Patent No.: US 8,678,475 B2
(45) Date of Patent: Mar. 25, 2014

(54) MOTOR VEHICLE WITH A REAR AIR GUIDING DEVICE

(75) Inventor: Okan Goenueldinc, Ostfildern (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 33 days.

(21) Appl. No.: 13/410,813

(22) Filed: Mar. 2, 2012

(65) Prior Publication Data

US 2012/0223545 A1 Sep. 6, 2012

(30) Foreign Application Priority Data

Mar. 3, 2011 (DE) .......................... 10 2011 001 054

(51) Int. Cl.
*B62D 37/02* (2006.01)
(52) U.S. Cl.
USPC ...................................................... 296/180.5
(58) Field of Classification Search
USPC .......................................... 296/180.1–180.5
See application file for complete search history.

(56) References Cited

U.S. PATENT DOCUMENTS

| | | | | |
|---|---|---|---|---|
| 1,895,750 A * | 1/1933 | Brown | .......................... | 180/89.1 |
| 3,455,594 A * | 7/1969 | Mrlik et al | ................ | 296/180.5 |
| 4,671,555 A * | 6/1987 | Linz et al. | ................. | 296/180.5 |
| 6,520,564 B1 * | 2/2003 | Liang | .......................... | 296/180.5 |
| 6,641,196 B1 * | 11/2003 | Hanagan | ....................... | 296/78.1 |
| 7,213,870 B1 * | 5/2007 | Williams | .................... | 296/180.5 |
| 7,607,718 B2 * | 10/2009 | Schwan et al. | ............. | 296/180.5 |
| 8,403,401 B2 * | 3/2013 | Rinehart et al. | ........... | 296/180.3 |
| 2002/0125738 A1 * | 9/2002 | Pettey | ........................ | 296/180.5 |
| 2011/0169299 A1 * | 7/2011 | Goenueldinc | ............. | 296/180.5 |

* cited by examiner

*Primary Examiner* — H Gutman
(74) *Attorney, Agent, or Firm* — Gerald E. Hespos; Michael J. Porco; Matthew T. Hespos

(57) ABSTRACT

A motor vehicle (1) has a rear air guiding device (2) and a mechanism (3) for receiving and fastening the air guiding device (2). The mechanism (3) has a pin (6) in one end region for hooking-in at a socket (14) in the air guiding device (2). Thus the air guiding device (2) can be pivoted relative to the mechanism (3). A connector (18) connects the air guiding device (2) and the mechanism (3) at a position spaced from the pin (6) and the socket (14). An adjustable spacer (8, 10) is between the air guiding device (2) and the mechanism (3) near the connector (18).

9 Claims, 2 Drawing Sheets

MOTOR VEHICLE WITH A REAR AIR GUIDING DEVICE

CROSS REFERENCE TO RELATED APPLICATION

This application claims priority under 35 USC 119 to German Patent Application No 10 2011 001 054.8 filed on Mar. 3, 2011, the entire disclosure of which is incorporated herein by reference.

BACKGROUND OF THE INVENTION

1. Field of the Invention

The invention relates to a motor vehicle with a rear air guiding device and a mechanism for receiving and fastening the air guiding device.

2. Description of the Related Art

DE 197 41 321 A1 discloses a motor vehicle with an air guiding device, also referred to as a rear wing or rear spoiler. The air guiding device can be extended up and retracted again from the extended position. Positioning means are provided for moving the air guiding device.

The air guiding device rests on a bearing plate of the mechanism for receiving and fastening the air guiding device. Screws are passed through holes in the bearing plate and are screwed into the air guiding device from below. The screws are in front and rear regions of the bearing plate with respect to the forward direction of travel of the passenger vehicle. The air guiding device protrudes over the bearing plate at the front and rear.

It is the object of the present invention to ensure simple mounting, installation and adjustment of the air guiding device with little structural outlay in a motor vehicle.

SUMMARY OF THE INVENTION

The invention relates to a mechanism for receiving and fastening an air guiding device. The mechanism has opposite first and second end regions. The first end region of the mechanism has hooking-in means for the hooking the air guiding device pivotably into the mechanism and the second end region of the mechanism has connecting means for connecting the air guiding device and mechanism. The air guiding device has complementary hooking-in means and connecting means. An adjustable spacer means is provided between the air guiding device and the mechanism.

The above-described configuration of the air guiding device and mechanism for receiving and fastening the air guiding device, enables the air guiding device to be plugged into the mechanism in a simple manner and then to be pivoted in the manner of a hinge into the fastening position with respect to the mechanism. The air guiding device then can be connected to the mechanism by the connecting means. The adjustable spacer means between the air guiding device and the mechanism permit the air guiding device to be adjusted with respect to both the mechanism and the outer contour of the motor vehicle in the region of the air guiding device. The spacer means can be adjusted so that the angular position of the air guiding device with respect to the mechanism changes, and the air guiding device therefore is pivoted about the pivot axis of the air guiding device and the mechanism in a manner corresponding to the position of the spacer means.

The means for hooking-in the air guiding device may be configured to hook the air guiding device into the mechanism at the front or rear, as seen in the forward direction of travel of the motor vehicle depending on the structural circumstances. For this purpose, the mechanism can have the means for hooking the air guiding device into the mechanism either in a front end region or a rear end region. Thus, the air guiding device can be plugged into the mechanism either in the forward direction of travel or counter to the forward direction of travel of the motor vehicle.

The air guiding device is preferably pivotable about a horizontal axis extending in the transverse direction of the motor vehicle. The horizontal axis refers to the motor vehicle standing on a horizontal plane.

The hooking-in means and the complementary hooking-in means preferably have regions with at least a partially circular cross section or partially circular cavity to form a hinge for a simple pivoting of the air guiding device with respect to the mechanism. Thus, the hooking-in means and the complementary hooking-in means may have a pin with a substantially circular cross section, and a socket for receiving the pin. Alternatively, these interacting hooking-in means may have spherical elements, such as ball pins, and sockets, such as ball sockets, for receiving the spherical elements.

The hooking-in means and the complementary hooking-in means also may comprise slots and tabs with contact regions in the shape of segments of a circle.

The interacting connecting means in the region facing away from the hooking-in region of the air guiding device may have at least one nut and one screw for a simple structural connection. The at least one nut may be mounted in the air guiding device and the at least one screw may be mounted in the mechanism. Fastening by two screws and two nuts is sufficient in most situations.

The spacer means may be a length-variable sleeve, such as a sleeve with a first part that is screwed into a second part. Fastening means, such as screws, may be passed through the two length-variable sleeves and screwed into a nut assigned to the air guiding device. The angle of inclination of the air guiding device with respect to the mechanism can be changed by changing the length of the sleeve. The screw assigned to the mechanism then is screwed into the nut of the air guiding device to fasten the air guiding device in the region facing away from the pivot axis of the air guiding device.

The mechanism preferably is mounted in a drive of the motor vehicle that can raise and lower the mechanism and therefore the air guiding device. The air guiding device therefore can be extended and retracted by means of the drive.

The invention provides an air guiding device or a rear wing/rear spoiler in a motor vehicle. The air guiding device or rear wing/rear spoiler preferably can be extended and/or adjusted. To simplify the manufacturing, the air guiding device is hooked in at one end region, for example at the front in the direction of travel, and, in this case, screwed down at the rear in the direction of travel. The hooking-in preferably employs a pin-and-socket principle, via a ball socket and ball or via slots and tabs. The region of the hinge-like mounting of the air guiding device, the air guiding device does not require separate fastening means, such as screws. Thus, the air guiding device is fairly flat in the region of the hinge-like mounting. This is of particular advantage if the aim is to configure the air guiding device to be lower at the front. This results in an improved optical and acoustic appearance. The hinge mounting of the air guiding device in the region of one end provides simple adjustability of the air guiding device during the manufacturing.

Further features of the invention emerge from the attached drawing and the description of the preferred exemplary embodiment in the drawing, without being limited to the exemplary embodiment.

DETAILED DESCRIPTION OF THE PREFERRED EMBODIMENTS

Figure 1:
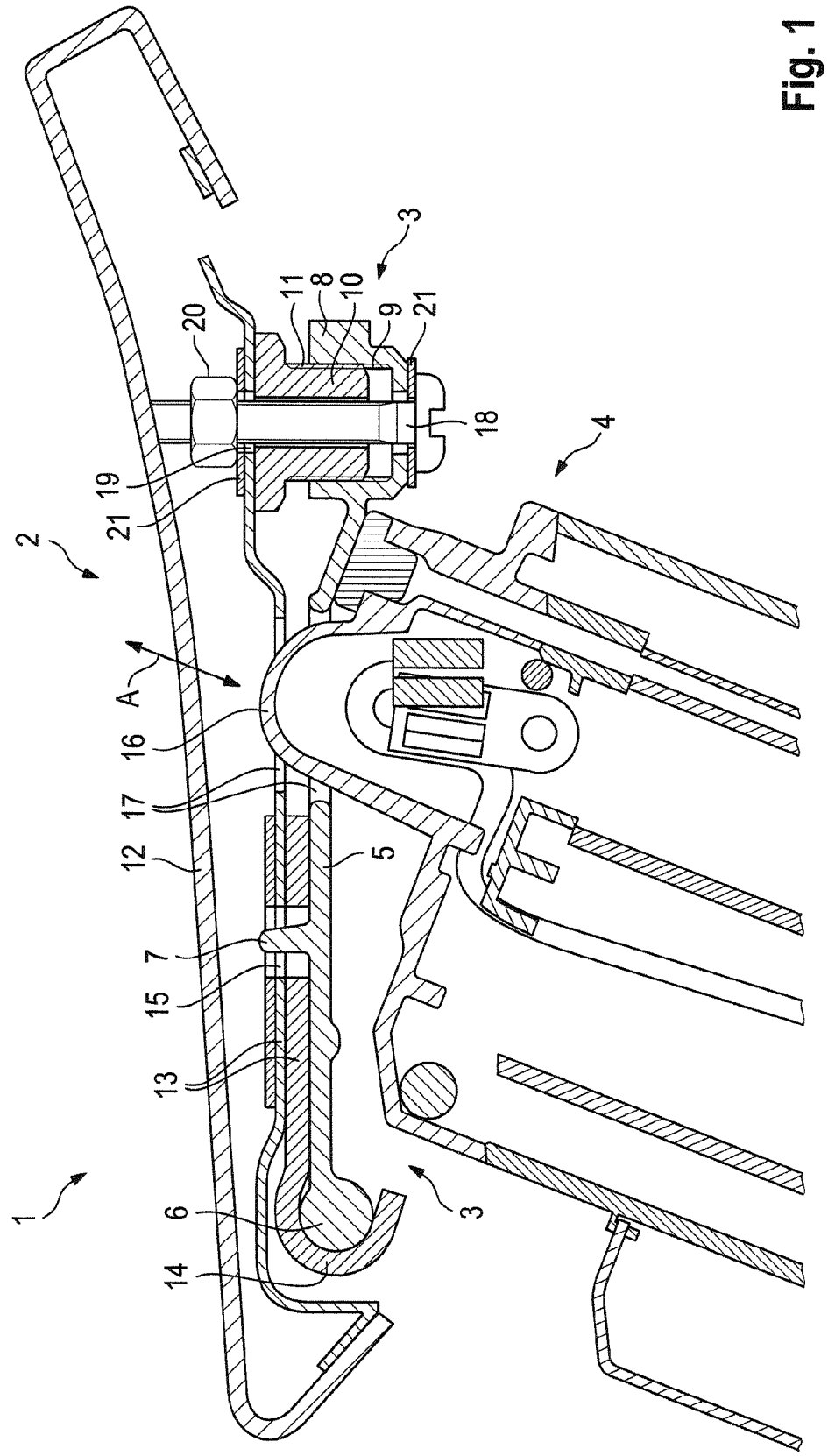
FIG. 1 shows a longitudinal section through a passenger motor vehicle in the region of an air guiding device and the mounting thereof on the vehicle.
Figure 2:
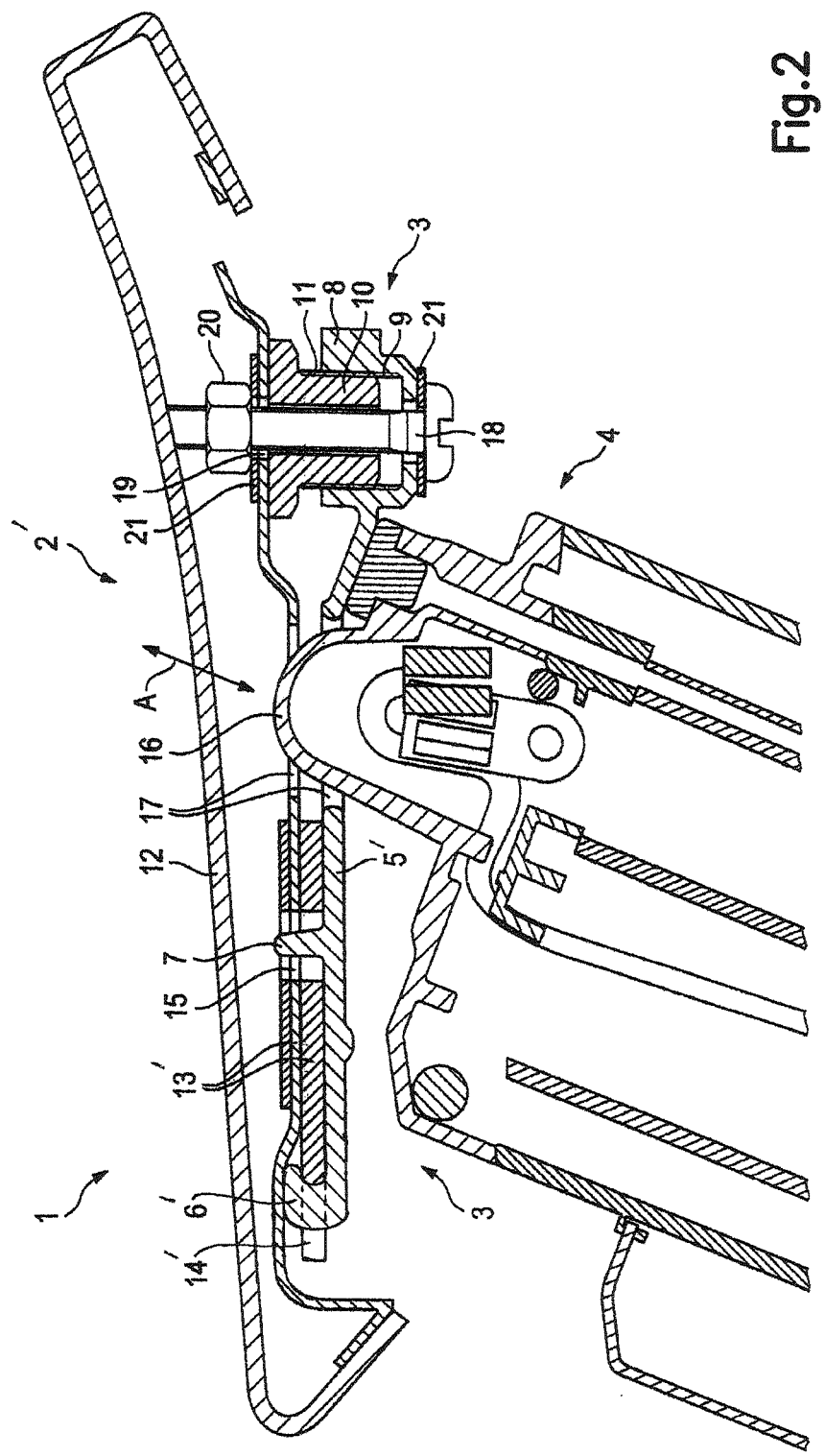
FIG. 2 shows a longitudinal section through a passenger motor vehicle in the region of an air guiding device and the mounting thereof on the vehicle in accordance with an alternate embodiment.

FIG. 1 illustrates the rear region of a motor vehicle 1 and specifically a sports car. The vehicle 1 has an air guiding device 2, also referred to as a rear wing or rear spoiler. The air guiding device 2 is received by a mechanism 3 that is mounted in a drive 4 for extending or retracting the air guiding device 2 in the direction of the double arrow A.

The mechanism 3 has a substantially horizontal bearing plate 5 that is connected to the drive 4. A pin 6 with a circular cross section extends over the length of the bearing plate 5 and along the width of the vehicle. The pin 6 is at the front or rear of the bearing plate, depending on the spatial specifications. A short lug 7 projects up from the bearing plate 5 at a position spaced from the pin 6. Sleeves 8 are provided respectively at left and right regions of the bearing plate 5 and at an end of the bearing plate 5 substantially opposite the pin 6 with respect to the forward direction of travel of the vehicle 1. Each sleeve 8 is formed with an internal thread 9. An adjusting element 10 with an external thread 11 is screwed into the internal thread 9 of the respective sleeve 8.

The air guiding device 2 has an upper, aerodynamically configured wing surface 12 and a frame part 13 that bears the wing surface 12. The frame part 13 forms a shaped part together with the wing surface 12 and extends below the wing surface 12. A socket 14 is formed in one end region of the frame part 13 defines an arc of a circle configured for receiving the pin 6. The internal radius of the socket 14 corresponds to the radius of the pin 6. The socket 14 extends in the width direction of the vehicle and has a length that corresponds to the direction of extension of the pin 6. The pin 6 and socket 14 therefore constitute means for hooking-in the air guiding device 2.

Assembly merely requires the air guiding device 2 to be positioned obliquely with respect to the illustration in FIG. 1 so that the pin 6 can be plugged into the socket 14. The air guiding device 2 then is pivoted clockwise to bear against the adjusting element 10 so that the lug 7 engages into a recess 15 in the frame part 13 with play in the longitudinal direction of the vehicle. As a result, the pin 6 cannot move out of the socket 14. The frame part 13 bears against the adjusting element 10 and a region 16 of the drive 4 passes through openings 17 in the bearing plate 5 and in the frame part 13 for space reasons.

A region of the frame part 13 that faces away from the socket 14 bears against the adjusting element 10. The adjusting element 10 is positioned in a defined manner with respect to the sleeve 8 and therefore is screwed by a certain amount into the sleeve 8 to adjust the angle of inclination of the air guiding device 2 as specified. A fastening screw 18 is plugged from below through the sleeve 8 and the adjusting element 10. The screw 18 passes through a hole 19 in the frame part 13 and is screwed into a nut 20 on that side of the frame part 13 that faces away from the adjusting element 10. Thus the connection of the air guiding device 2 and the mechanism 3 is fixed in the region of the end of the frame part 13 that faces away from the pin 6 and the socket 14. Washers 21 are provided in the region of the fastening screw 18 and nut 20.

The air guiding device 2 of the invention is hooked in and then screwed down during mounting. The hooking-in takes place via a pin-and-socket principle. In this case, the socket 14 is assigned to the air guiding device 2 and the pin 6 to the drive 4. Of course, this principle may be reversed so that the pin is mounted in the air guiding device and the socket in the drive. The hooking-in forms a type of hinge. Thus, there is the option of providing the adjustment of the air guiding device 2 on the opposite side. The adjustment is achieved by the adjusting device 10 so that the gap between the air guiding device 2 and a lower shell (not illustrated) of the motor vehicle can be adjusted in the region of the air guiding device 2. The screw connection fixes the position of the air guiding device 2. The air guiding device 2 can be installed rapidly and conveniently by being hooked in and subsequently screwed down with two fastening screws 18. This reduces the installation time considerably and provides good optical appearance, good aerodynamics, and improved aeroacoustics due to fewer visible fastening screws 18. Little construction space is needed at the hooking-in region, since the fastening screw and the accessibility thereof do not have to be taken into consideration.

What is claimed is:

1. A motor vehicle, comprising:
a rear air guiding device having opposite first and second end regions spaced apart along a forward direction of travel of the motor vehicle; and
a mechanism for receiving and fastening the air guiding device, the mechanism having opposite first and second end regions spaced apart along the forward direction of travel of the motor vehicle;
a pivotable hook and pin first connection between the first end region of the air guiding device and the first end region of the mechanism for pivotably hooking-in the air guiding device and the mechanism, the first connection comprising a pin with a substantially circular cross-section and a socket with an open side dimensioned for receiving the pin; and
a non-pivotable second connection between the second end region of the air guiding device and the second end region of the mechanism for non-pivotably connecting the air guiding device and the mechanism, the second connection including an adjustable spacer between the air guiding device and the mechanism for adjusting alignment of the air guiding device relative to the mechanism.

2. The motor vehicle of claim 1, wherein the hook and pin pivotable first connection is at a front end region of the air guiding device relative to a forward direction of travel of the motor vehicle.

3. The motor vehicle of claim 1, wherein the hook and pin pivotable first connection defines a horizontal pivot axis extending in a transverse direction of the motor vehicle.

4. The motor vehicle of claim 3, wherein the at least one screw is aligned substantially perpendicular to the pivot axis.

5. The motor vehicle of claim 1, wherein the non-pivotable second connection has at least one nut mounted in the air guiding device and at least one screw mounted in the mechanism.

6. The motor vehicle of claim 1, wherein the spacer is a length-variable sleeve having two threadedly connected sleeve parts.

7. The motor vehicle of claim 1, wherein the non-pivotable second connection has a screw that passes through the spacer.

8. The motor vehicle of claim 1, further comprising a drive mounted to the mechanism, the drive being configured for raising and lowering the mechanism and the air guiding device.

9. The motor vehicle of claim 1, wherein the socket has a concave surface defining a substantially circular cross-section substantially conforming to the circular cross-section of the pin.

\* \* \* \* \*